US 6,676,460 B1

(12) United States Patent
Motsenbocker

(10) Patent No.: US 6,676,460 B1
(45) Date of Patent: Jan. 13, 2004

(54) ELECTRONIC PROPELLER GUARD

(75) Inventor: Marvin A. Motsenbocker, Fredericksburg, VA (US)

(73) Assignee: Maruta Electric Boatworks LLC, Fredericksburg, VA (US)

( * ) Notice: Subject to any disclaimer, the term of this patent is extended or adjusted under 35 U.S.C. 154(b) by 25 days.

(21) Appl. No.: 10/187,830

(22) Filed: Jul. 3, 2002

Related U.S. Application Data

(60) Provisional application No. 60/349,375, filed on Jan. 22, 2002, provisional application No. 60/323,723, filed on Sep. 21, 2001, and provisional application No. 60/302,647, filed on Jul. 5, 2001.

(51) Int. Cl.$^7$ .............................................. B63H 21/22
(52) U.S. Cl. ............................................. 440/1; 440/71
(58) Field of Search ..................... 440/1, 2, 56, 65, 440/71, 74, 84

(56) References Cited

U.S. PATENT DOCUMENTS

| | | | |
|---|---|---|---|
| 3,329,929 A | | 7/1967 | Burnett |
| 3,805,723 A | * | 4/1974 | Bernaerts .................... 114/338 |
| 3,889,624 A | | 6/1975 | Balius |
| 4,078,516 A | | 3/1978 | Balius |
| 4,106,425 A | | 8/1978 | Gruber |
| 4,304,558 A | | 12/1981 | Holtermann |
| 4,349,897 A | | 9/1982 | Boehme et al. |
| 4,411,631 A | | 10/1983 | Makinen et al. |
| 4,565,533 A | | 1/1986 | Springer |
| 4,630,205 A | * | 12/1986 | Otaka .......................... 701/70 |
| 4,780,085 A | | 10/1988 | Malone |
| 4,826,461 A | | 5/1989 | Newman |
| 4,890,265 A | | 12/1989 | Goldstein |
| 4,933,609 A | | 6/1990 | Clark |
| 4,938,721 A | * | 7/1990 | Koike ........................... 440/2 |
| 4,957,459 A | | 9/1990 | Snyder |
| 5,009,620 A | | 4/1991 | Feranda, Sr. |
| 5,019,822 A | | 5/1991 | Kirkland |
| 5,146,208 A | | 9/1992 | Parra |
| 5,168,471 A | | 12/1992 | Parra |
| 5,168,473 A | | 12/1992 | Parra |
| 5,209,237 A | | 5/1993 | Rosenthal |
| 5,238,432 A | | 8/1993 | Renner |
| 5,313,556 A | | 5/1994 | Parra |
| 5,369,269 A | | 11/1994 | Fukuda et al. |
| 5,418,359 A | | 5/1995 | Juds et al. |
| 5,659,231 A | | 8/1997 | Svarovsky et al. |
| 5,694,653 A | | 12/1997 | Harald |
| 5,759,075 A | | 6/1998 | Steep et al. |
| 6,094,023 A | | 7/2000 | Ericsson |
| 6,276,974 B1 | * | 8/2001 | Bouge et al. ................... 440/1 |
| 6,354,892 B1 | | 3/2002 | Staerzl |
| 6,377,515 B1 | | 4/2002 | Healey |

OTHER PUBLICATIONS

Propeller Guard Article on Internet (www.rbbi.com) alleged first date of Jan. 7, 1999 (a private web site).

* cited by examiner

*Primary Examiner*—Stephen Avila

(57) ABSTRACT

Electronic methods, devices and kits electronically protect swimmers, animals and other objects in water from propeller strikes, and alleviate propeller damage. Desirable embodiments include continuous ultrasonic sensing and detection by separate sensors to minimize reaction time for stopping internal combustion engine and electric motor driven propellers. Electric boats having direct drive to propellers are particularly amenable for electronic propeller protection. A variety of sensors may be used, including tactile, ultrasonic, galvanometric and infrared sensors. Optionally, the devices and systems can improve performance, safety and economy of boat rental operations by discouraging, limiting and even reporting propeller strikes to a boat custodian, who may be at a different location when the boat is used.

56 Claims, 7 Drawing Sheets

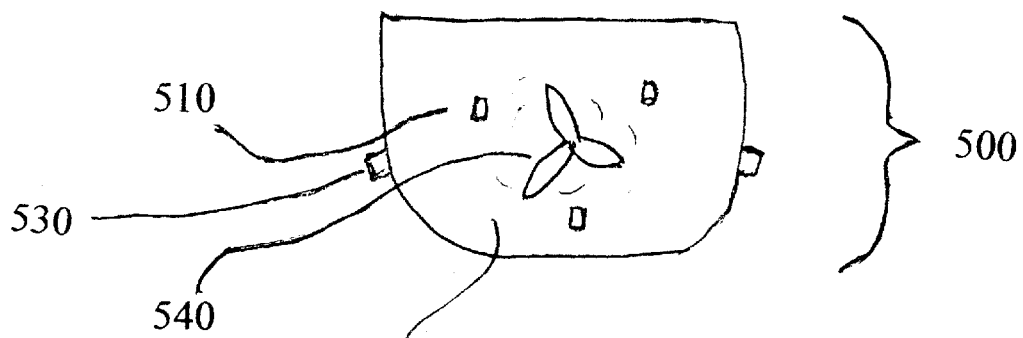
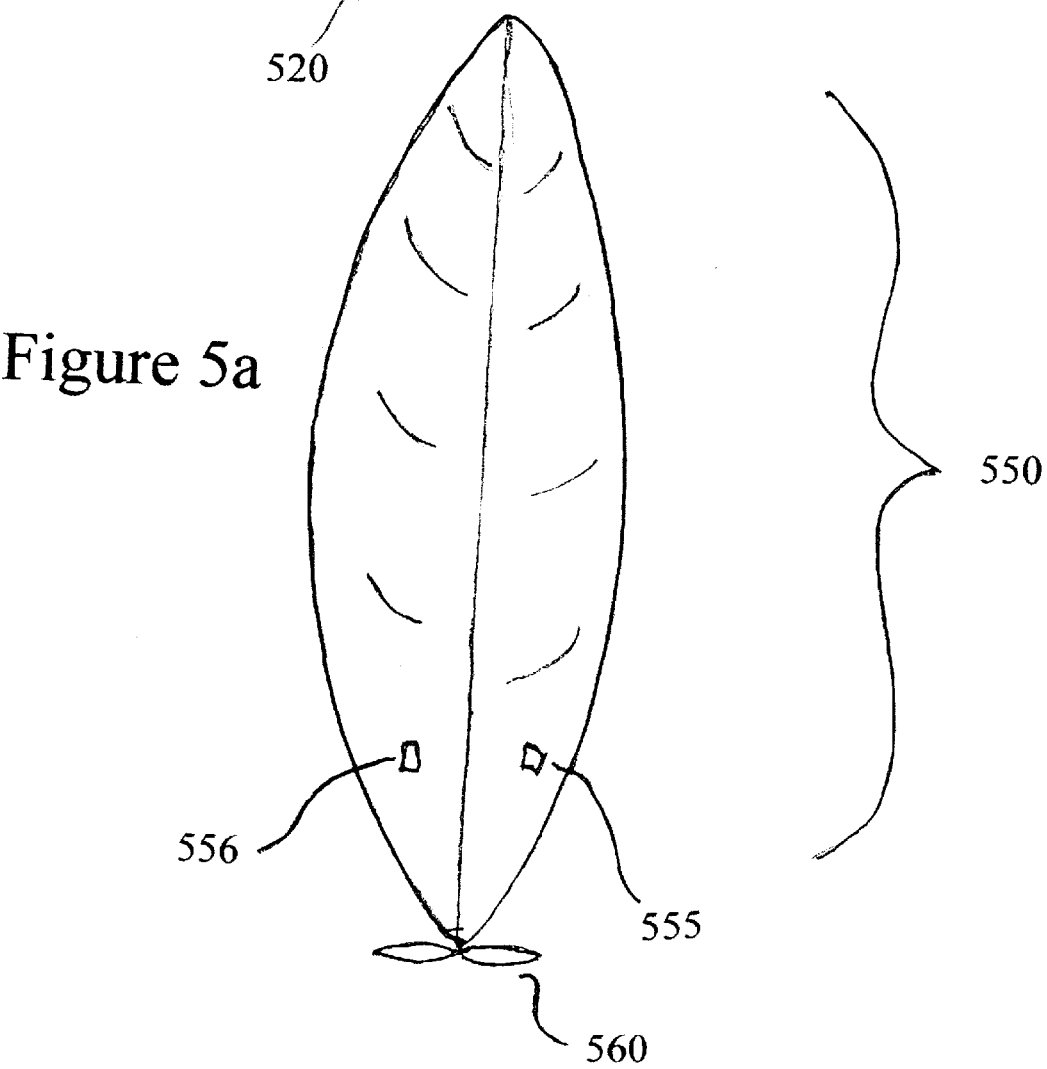

ELECTRONIC PROPELLER GUARD

REFERENCE TO RELATED APPLICATIONS

This application receives priority from U.S. provisional application No. 60/323,723 filed Sep. 21, 2001, No. 60/302, 647 filed Jul. 5, 2001 and No. 60/349,375 filed Jan. 22, 2002, the contents of which are incorporated by reference in their entireties.

FIELD OF THE INVENTION

The invention relates to watercraft sensors and to propeller safety devices and systems.

BACKGROUND OF THE INVENTION

According to statistics kept by the U.S. Coast Guard, scores of people are killed or severely maimed each year from propeller injuries. Other mammals such as manatees are severely injured and disfigured and this problem threatens the tourism industry in areas such as Homosassa Springs State Park in Florida. The boating industry has struggled with this problem without much success for some time. The often proposed solution of using a mechanical propeller guard to physically block contact, while logical at first glance actually is very impractical, despite a number of attempts to implement this idea as described in U.S. Pat. Nos. 3,889,624; 4,411,631; 44,826,461; 4,078,516; 5,238, 432; 4,957,4459; 5,009,620; 4,304,558; 5,759,075; 4,565, 533; and 4,106,425. The guard would rob too much propulsion power and in some cases could increase the occurrence and severity of propeller injuries because the guard can act as a catch that prevents easy removal of a hand or foot from the propeller vicinity as commented on, for example by the Superior Court of Pennsylvania (Fitzpatric v. Madonna, 623 Aa.2d 322 1993), which stated that "the presence of a shroud over the propeller presents its own risks for swimmers. For example, a shroud creates a larger target area. In addition, the possibility exists that human limbs may become wedged between a shroud and the propeller, exposing a swimmer to even greater injury."

New propeller guard solutions have been proposed in view of the disadvantages of using a propeller guard. Another such proposal is a guard that moves away from the propeller at high speed as described in JP5,310,188. Another is a switch on a ladder that prevents a fossil fueled motor from engaging when a swimmer's ladder is down, as described by Propeller Safety Technologies (Anderson Calif., www.propguardinc.com). A kill switch may prevent the problem of a passenger falling into the water during rapid boat movement. However, swimmers remain at risk of sudden contact with a boat at high speed. Others have mused over the possibility of sensing objects in the water (http://www.rbbi.com/invent/guard/propg/intro.htm) in a helpful effort to try and bring research groups working on animal and human detection in the water to think of this problem. However, there has been no solution that suitably accounts for the problems of motor inertia and the need for very rapid reaction times. Furthermore, most proposed solutions also do not address sufficiently the related problem of propeller contact with solid objects such as rocks while in operation. When the propeller is spinning rapidly during the contact, the propeller blades tend to quickly shear or grind down on the collided object, and can slice a human body many times in just one second.

In sum, the boating industry needs a low cost solution to propeller contact with solid objects. The issue of safety will become even more of a problem as the waterways become more and more crowded due to the obvious overpopulation and consequent egregious overuse of the limited resources of the planet. Accordingly, a system to prevent or alleviate this problem would help promote the boating industry make the waterways safer and allow even more commercially desirable overcrowding while minimizing damage from open propellers.

SUMMARY OF THE INVENTION

The invention provides a system for quickly stopping a propeller before the propeller can significantly damage a solid object that appears immediately upstream of the propeller. In embodiments of the invention an electronic sensor detects a solid object that enters a danger zone near the propeller and triggers a circuit that rapidly stops the propeller. In other embodiments a device records, monitors and reports in real time instances of sensing imminent contact of a propeller with a solid object.

Another embodiment provides a system to limit contact of a propeller having a diameter D with a solid object in a motor driven watercraft comprising at least one sensor that monitors a danger zone, the zone comprising a circular area of diameter D located distance D immediately ahead of the propeller perpendicular to the direction of motion and outputs a signal in response to intrusion of a solid object in the danger zone; and an activator electric control circuit that stops motor movement upon receipt of the signal.

Another embodiment provides a watercraft that contains a system for limiting propeller contact with a solid object in the water, comprising at least two monitor sensors attached to one or more control surfaces in the water and upstream of the propeller that output an electrical response upon detection of the solid object; and an electric control circuit that accepts the signal and stops motor movement upon the detection of the solid object.

Yet another embodiment provides an electrical control device for suddenly stopping a propeller in a motor driven watercraft, comprising a sensor that detects a solid object near the propeller and a control circuit that can stop or slow the propeller to less than 10 rpm within one second, wherein the sensor triggers the control circuit upon sensing the solid object.

Further embodiments will be appreciated from a reading of the specification.

DESCRIPTION OF THE DRAWINGS

FIG. 2b shows detail of a sensor for the system of FIG. 2a.

FIG. 5a shows a bottom hull view of a two sensor system on a boat hull for detecting imminent propeller contact.

FIG. 5b shows a rear hull view of a three sensor system on a boat hull for detecting imminent propeller contact.

DETAILED DESCRIPTION OF THE INVENTION

Figures 1A, 1B, 1C, 1D:
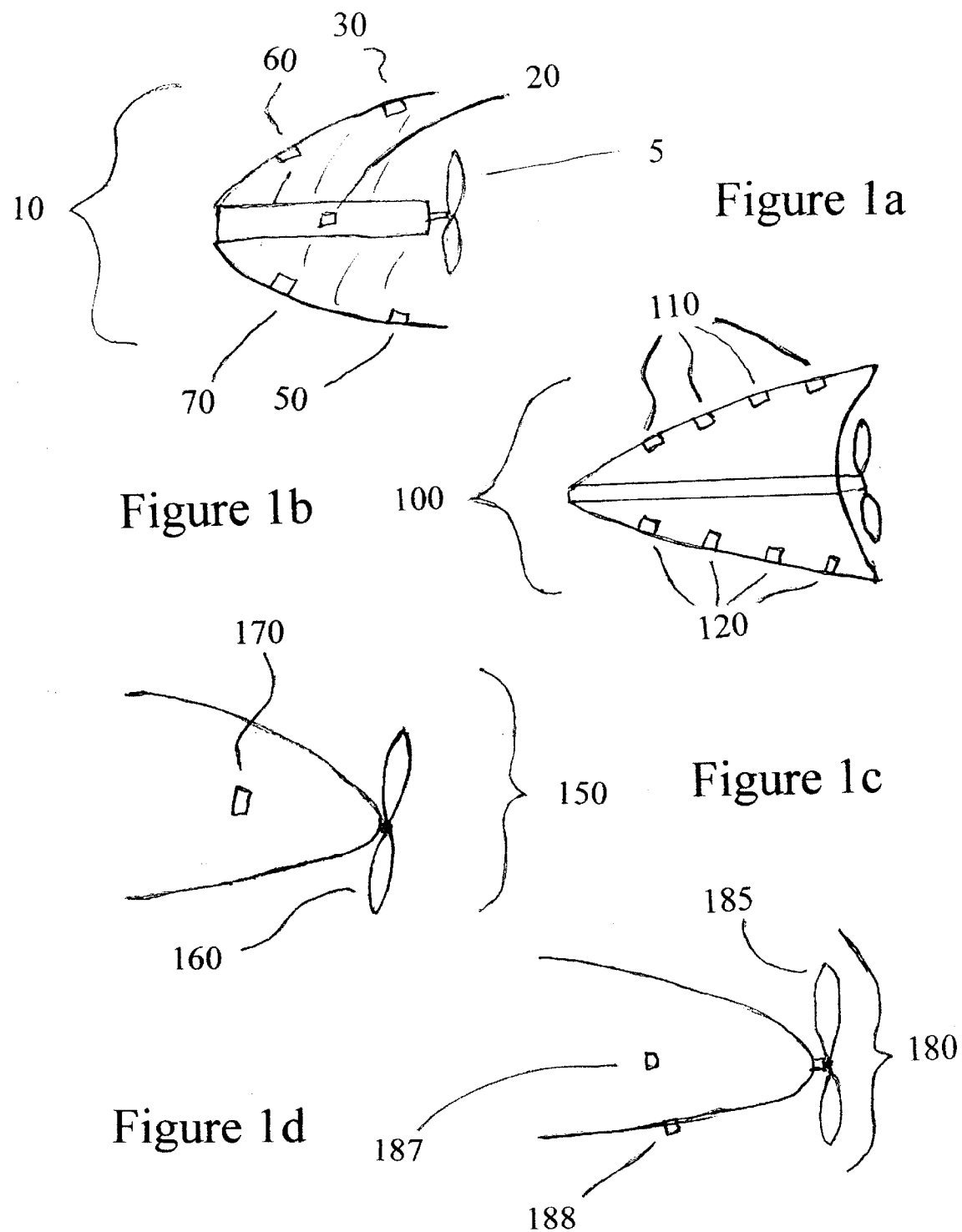
FIG. 1a shows a side view of two sensor and 4 sensor systems for detecting imminent propeller contact with a solid body.
FIG. 1b shows a side view of an 8 galvinometric electrode sensor system in a two control surface system for detecting imminent propeller contact with a solid body.
FIG. 1c shows a side view of a boat hull mounted 2 sensor system for detecting imminent propeller contact with a solid body.
FIG. 1d shows a side view of a boat hull mounted 6 sensor system for detecting imminent propeller contact with a solid body.

During his studies of higher speed efficient electric watercraft, the inventor discovered that both electric motor and fossil fuel motor driven propellers could be rapidly controlled in response to conditions. Furthermore, during the design and building of prototype propellers and hulls, the inventor discovered that at least one, and preferably, at least two sensors appropriately placed could be used in a system that rapidly halts a propeller when an object such as a rock, manatee, hand, foot or leg enters a danger zone immediately upstream or downstream of the propeller. In an embodiment one or both sensors emit pulses of sonic energy and then detect reflected signals to determine the approach of the object in a danger zone. In another particularly desirable embodiment that responds more rapidly to solid object intrusion, at least one sensor emits a continuous sonic signal and at least one other sensor continuously monitors the signal (or lack thereof) to determine approach of an object.

A preferred embodiment of the invention includes: a) an electric motor driven propeller water craft; one or more sensors that scan at least most of the danger zone in front of and/or behind the propeller; and c) a circuit that rapidly halts the propeller upon detection of a solid object in the danger zone. In another form, a preferred embodiment includes: a) an internal combustion motor driven propeller water craft; one or more sensors that scan at least most of the danger zone in front of and/or behind the propeller; and c) a circuit that rapidly halts the propeller upon detection of a solid object in the danger zone. In another form a preferred embodiment of the invention includes a) an internal combustion engine driven propeller water craft; one or more sensors that scan at least most of the danger zone in front of the propeller; and c) a circuit that rapidly halts the propeller upon detection of a solid object in the danger zone by activating a friction device attached to the motor and/or propeller shaft.

For purposes of convenience and clarity of the attached claims, the term "danger zone" as used here means a 2 dimensional area that may be upstream or that may be downstream of the propeller covering a plane perpendicular to the propeller axis of rotation, the area including the circle created by the propeller with the propeller axis at the circle center and the propeller tip at the circle circumference. The danger zone area may be positioned in front of the propeller by a distance equal to one propeller diameter. The danger zone area may be positioned behind the propeller by a distance equal to one propeller diameter. The danger zone area may be simultaneously positioned in front of and behind the propeller by a distance equal to one propeller diameter. Other positions may be used. In another embodiment the danger zone is positioned in front of and behind the propeller by a distance equal to two propeller diameters.

In yet another embodiment at least one contact (mechanical) switch or continuous sensor is located on a hull surface to feel when the hull surface approaches a solid object such as a rock or muddy bottom of a waterway. Upon physical contact, a switch activates, and switches a warning device such as a buzzer and/or stops a propeller. The propeller may be stopped for a set period of time such as 1, 2, 3, 5, 10, 20, 30, or 60 seconds or simply switched off. Desirably, a memory device such as a microprocessor records the event, which can be read out later. Also desirably, a custodian of the watercraft, who may be renting the watercraft to the operator, is informed of the event by automated radio signaling. The signaling optionally includes an ID code denoting which watercraft had the event and optionally includes a code denoting how fast the watercraft was traveling when it had the event. In yet another embodiment the system further includes a motor governor circuit that automatically limits the motor power or propeller speed temporarily or permanently upon sensing a predicted collision. In yet another embodiment a kit is provided for adding an electronic propeller guard to a watercraft, including sensors and circuits as described herein, along with one or more fasteners for attaching sensor(s) to the watercraft surface, such as bolts, glue, tape, screws, epoxy, clamps and the like.

Systems that Contain Sensor and Activator Circuits

An electronic propeller guard in a preferred embodiment of the invention comprises a sensing component (circuit or circuit component) and an activating component (circuit or circuit component). The sensing component may pulse monitor or may constantly monitor most (at least 50%), substantially all (at least 90%), virtually all (at least 95%) or all (100%) of danger zone area(s) and detects intrusion of an object into one or more zones. A danger zone preferably is anywhere between the propeller itself to 5 propeller diameters upstream or downstream of the closest side of the propeller surface. In one embodiment the zone is determined at a distance between 0.5 and 1 propeller diameters from the propeller. In another embodiment the zone is determined at a distance of 2 diameters from the propeller. In yet another embodiment the zone is determined at a distance of 3 diameters from the propeller. Upon detection of a solid object, a signal controls an activator circuit that rapidly stops or slows (i.e. decreases to less than 60 rpm and preferably less than 10 rpm) the propeller within 0.5 seconds. In one embodiment the activating circuit rapidly stops or slows the propeller within 0.2 second. In other embodiments the circuit stops or slows the propeller within 0.1 seconds, 0.05 seconds, 0.025 seconds, 0.01 seconds, 0.005 seconds and even within 0.002 seconds.

In another embodiment a tactile sensor is located on a hull surface upstream from a propeller and extends at least 1, 2, 3, 5, 8, 10, 15 or 24 inches away from the hull. Two or more sensors can be spaced apart to sense solid objects in a wider volume. In this embodiment a defined "danger zone" per se is not necessarily determined. This embodiment is particularly valuable for sensing rocks on the bottom that may collide with a propeller. In a particularly preferred embodiment, such tactile sensor outputs more than a simple on-off signal. For example, a tactile feeler may be connected to a potentiometer, hall effect sensor, magnet or other device that is used to generate a signal that is proportional to the amount of deflection in the tactile sensor. In an embodiment, a light, buzzer or other signaling device alerts a boat operator to various degrees for example, by increasing the volume of sound as the tactile sensor is deflected more.

This sensor/alert device and/or propeller shut off system is particularly useful when installed on rental watercraft. A major problem with rental craft is the destruction of propellers and propulsion systems by careless users. An alert system as described here can prevent boat damage by at least three different actions. One, a sensed propeller collision can trigger an automatic motor shut down or limit in power, for a set period of time or until the boat returns to the custodian, who may reset the motor power. Two, the system can record instances of detection, and make a record, to be reviewed by the boat caretaker (renter) later on, such as when the caretaker needs to make a decision on giving a withheld damage fee back to the renter. Three, the system can alert the boat caretaker by wireless transmission. The latter technique is particularly useful where the receiver is located at a high enough position to receive signals and no island or other structure blocks transmission. The boat caretaker may respond by controlling the boat via a radio command or by calling the boat operator. For low cost operation, it is very desirable to use family radio, which is particularly suited over water, in many cases for up to two miles of line of sight.

In an embodiment the sensor turns off the propeller and an override switch must be activated to turn the propeller back on. In yet another embodiment a memory device such as a microprocessor records the event and can inform others such as a boat renter of the collision, or near collision history. In yet another embodiment the boat further comprises a wireless transmitter that sends signal(s) to a boat renter indicating the collision/near collision problems in real time, and/or optionally, boat speed information. The wireless reporting of speed, and/or boat collisions with solid objects in real time may be used for other embodiments of the invention as well.

In an embodiment that intends to protect people who fall directly or nearly directly on top of the propeller, a danger zone in front of the propeller is extended to include an area vertically above and immediately in front of the propeller, hereinafter termed "extended danger zone." By "an area above and immediately in front" is meant a rectangular and horizontal surface area beginning above the top of the propeller arc (immediately at the top of the propeller arc or up to one propeller diameter above that point). The rectangle width is the propeller diameter and length extends from the rear of the propeller forward two propeller diameters or until a hull surface is reached. An extended danger zone also may exist behind the propeller.

Figure 4A:
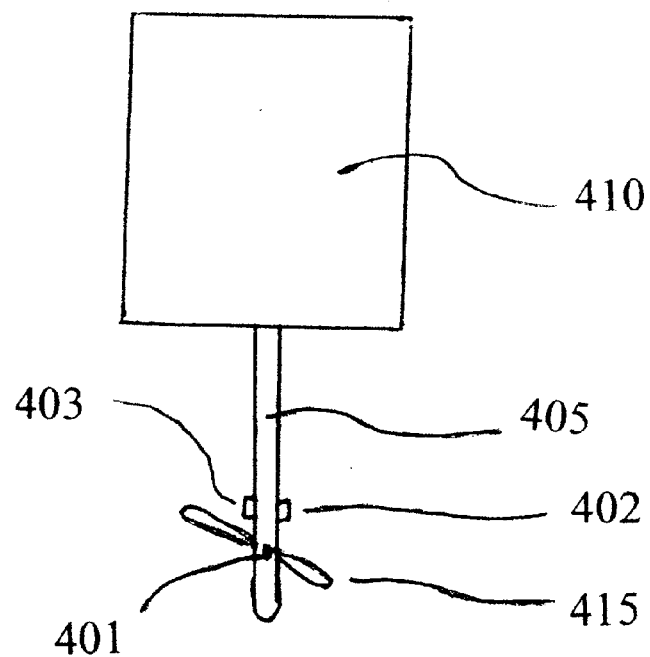
FIGS. 4a through 4c show front and side view respectively of how one, two and three sensor systems may be used for detecting imminent propeller contact with an outboard electric motor.
Figure 4B:
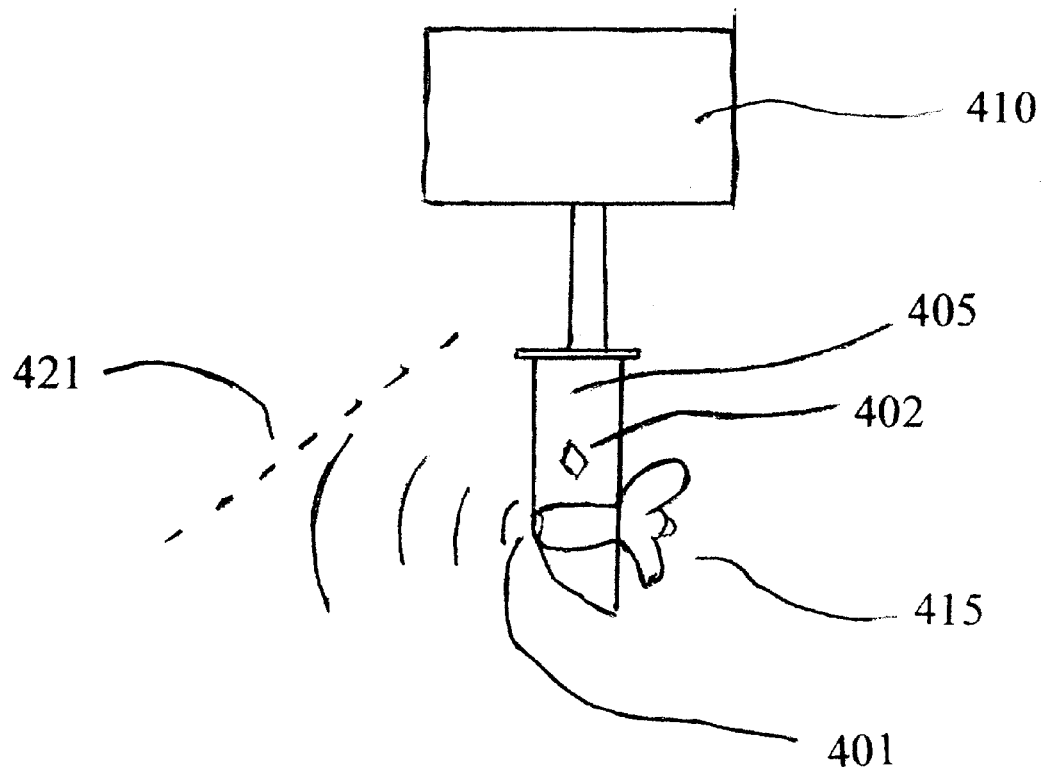

By way of example as seen in FIG. 4b, an extended danger zone for a 10 inch propeller 415 consists of partly horizontal (45 degrees from horizontal) area 421 (see dotted line, which is a cross sectional side view) that extends above propeller 415 and ahead, and utilizes sensor 402. Not shown in this figure is another sensor directly behind sensor 402 and that monitors the other side of the drive shaft (including the right half of the partly horizonal zone). Both sensors are directed up towards the water surface and forward towards the front of the boat. In one embodiment the sensors are directed between 30 and 60 degrees down from the horizontal, facing forward. When a piezoelectric crystal sonic sensor is used for this embodiment, the flat surface of the crystal preferably is perpendicular to the desired angle. Of course, other danger zones and extended danger zones may be desired and used depending on the circumstances of each specific application and the examples provided herein are representative in that regard.

A sensor which monitors the danger zone or extended danger zone signals an activator to quickly halt the motor upon sensing an intrusion into that zone. Of course, most sensors will respond to intrusion into a larger zones than that defined here. A sensor often will monitor a much larger area and space, and the "danger zone" and "extended danger zone" defined here are minimum areas that should be monitored for satisfactory operation.

In an embodiment the sensor outputs a signal that triggers an activator circuit that quickly halts the electric or fossil fueled motor which drives the propeller. The activator may be as simple as a control component such as a resister, MOSFET, relay or capacitor involved in signaling or that directly controls the electric motor power or a motor circuit, or a power circuit that energizes a brake (and/or shuts off ignition) in a fossil fueled system but generally will comprise a larger portion of an overall control circuit that dissipates the motor kinetic energy or, more preferably applies an opposing field to actively push against the angular kinetic motion of the motor shaft. In one embodiment of the invention a friction brake halts the fossil fueled motor without halting an ignition high voltage (spark) pulse and preferably halts between sparks. In another embodiment that employs a fossil fuel powered engine an ignition spark is interrupted and a friction brake is energized.

Upon activation by the activator circuit the motor control decreases propeller speed to below a value, (preferably 120 rpm or less, more preferably 60 rpm or less, yet more preferably 30 rpm or less, more preferably 10 rpm or less) and more preferably stops the propeller before an object detected in the danger zone can contact the propeller.

Preferably the motor shaft directly couples to the propeller, to allow rapid changes in angular shaft momentum without an intermediary transmission (gear(s) belt(s) or other means) to change rotation speed. A big problem with some watercraft that hinders optimum use of an electronic propeller guard as described here is the inability of many motor/transmission/propellers to suddenly stop without damaging the motor or (if used) transmission. Another problem has been the inability to rapidly slow or stop the propeller with a few revolutions or even within a single revolution. An embodiment to address this problem uses a clutch plate or other mechanical device which disconnects the motor shaft from the motor and/or transmission (i.e. reduction gear). Such devices are appreciated by mechanical engineers.

The Sensor Circuit

A sensor circuit comprises one or more electronic components that output an electric signal indicating intrusion of a solid object into water in front of a sensor. A large variety of sensors may be employed that can scan the water (and in some cases air space above the water) immediately in front of, to the rear of, and/or above and below the propeller during propeller motion. Galvinometric devices can be used by measuring conductivity in the water and detecting intrusion of a body that differs in conductivity. Galvinometric (conductivity) measurements generally require use of strong signal processing or filtering to remove unwanted signals such as that produced by wave and bubble activity. These and radiowave devices using pulsed or constant energy fields can be used to sense such objects and/or their movement, as, for example, described in U.S. Pat. Nos. 5,694,653; 3,329,929 and 5,019,822 and described by Gagnon and Frechette, IEEE Annual International Carnahan Conference on Security Technology (Oct. 12–14, 1994 meeting in Albuquerque New Mexico, pp. 26–30).

A tactile sensor may be an on-off switch such as a microswitch connected to a feeler such as a wire whisker or stick or fin. A wide variety of tactile sensors are known and may generate continuously varying signals. For example, an optic fiber may be used that alters the degree of deflection by optic changes within the fiber as the light path shortens or lengthens with bending. A hall effect sensor (or conjugate magnet) may be attached to a probe on the inside of a boat and generate a signal as the probe moves.

Sonic sensing with Piezoelectric Devices

Most preferably a sensor uses piezoelectric device based sonic sensing within the water, with either (a) at least one piezo device as a transmitter and at least one piezo device as a receiver or (b) one piezo device that acts as both transmitter and receiver, by alternately sending an acoustic signal and then detecting reflection of that signal. The term "sensor" as used herein includes both (a) and (b) type acoustic sensors. The piezo substrate movement generates a voltage that is amplified and compared or adjusted to make a control signal. This sensing technique is known, as for example, exemplified in U.S. Pat. Nos. 5,146,208; 5,168,471; 5,168, 473; 5,313,556; 4,349,897; 4,780,085; 5,209,237 and 5,418, 359.

Preferably the sound energy is continuously created as a pulse, or more preferably as a continuous tone or tone pattern. For faster response it is particularly preferred to use ultrasonic frequencies over 20,000 hertz, although audible frequencies also may be used. This is because many desirable_lock in circuits require detection of one or several complete cycles to lock in and make an accurate detection of a reflected or refracted sound, or sudden loss in the sound. By way of example a lock in circuit that requires detection of two cycles of a particular frequency will require at least 0.002 seconds to detect the presence or absence of a 1 kilohertz and may require even more time. Other circuits that generate or detect more complicated waveforms or patterns likewise require a minimum frequency and or periodicity of pulse for fast response. Preferably a constant energy output device is used that generates a constant frequency of at least 8 kilohertz, more preferably at least 20 kilohertz and yet more preferably at least 40 kilohertz.

Higher frequencies of above 20,000 and particularly above 40,000 and even above 100,000 are particularly desirable to improve response time, efficiency and directionality of transducers used for sonic sensing. The higher frequency energy has corresponding shorter wavelengths. In an embodiment a transducer is used having at least one vibrating (or vibration sensing) surface in contact with water that is approximately (within 10 percent, preferably within 3 percent) the same length as the wavelength of the sonic wave in water. The wavelength of the sonic wave in water is determined by dividing the speed of sound in water by the frequency of the sonic vibration. In an embodiment one or more sonic transmitters are used with such dimensions together with one or more detectors that can be of any size. This is because efficiency and directionality of the transducer is more important for the transmitter than for the detector for embodiments that utilize separate devices.

Particularly desirable is the use of a ceramic or other solid piezoelectric transmitter operating at a resonant frequency and/or selected overtone frequencies, together with a plastic piezoelectric detector that responds to a wide range of frequencies. The inventor discovered from experiments that organic polymer piezoelectric devices (such as plastics) are very useful for sensing but work best when used together in a system with inorganic devices (such as a ceramic) as transmitters. Accordingly, in an embodiment a preferred sensor includes an inorganic device as a transmitter and an organic device as a receiver. The two devices in many permutations are best placed at different locations of a hull or hull extension, with a transmitter sending energy away from the hull in one direction and the receiver facing away at a different direction to receive energy. In one embodiment the transmitter and receiver directions are approximately ninety degrees (ie. 30 to 150 degrees, more particularly 45 to 135 degrees) apart. This orientation, while not that useful for determining distance, is very useful for robust yes/no detection of solid objects, because scattered energy that may reflect off of surfaces further away than the danger zone will be greatly diminished as a result of the positional orientation.

In a desirable embodiment two frequencies or pulse types are used together to sense two different danger zones simultaneously. For example a starboard side piezoelectric transmitter may be used at 40 kilo hertz and emits 40 kilohertz sonic waves on the starboard side. A port side piezoelectric transmitter may be used at 60 kilo hertz and emits 60 kilohertz sonic waves on the port side. A piezoelectric detector that responds to both signals (one representing a port side danger zone and the other representing a starboard side danger zone) may be placed in the center and generates electrical signals corresponding to both zones. A wide bandwidth sensor such as a plastic piezoelectric should be used in the embodiment where one sensor detects two different kinds of signals. Of course, one or more separate detectors may also be used for each transmitter and multiple common detectors may be used, as well as combinations of this. In yet another embodiment three or more different transmitters are used with one or more sensors. In yet another embodiment two pulsed transducers use the same frequency but are synchronized, as described in U.S. Pat. No. 6,377,515 issued Apr. 23, 2002.

In a most simple arrangement, flat or mostly flat sensors are mounted on different portions (hereinafter "control surfaces") of the boat hull. Preferably the transmitter constantly sends out a signal or pulses the signal. In one embodiment the receiver constantly reads a reflection signal, and a difference in the received signal (increase in reflected signal compared to a previous background signal) indicates entry of an object into the danger zone or extended danger zone. The sensor circuit(s) should be tuned to detect only solid bodies in the immediate vicinity and in the danger zone or extended danger zone. Preferably the sensed zone will be larger than the danger zone (or extended danger zone) in order to provide a greater margin of safety.

Another embodiment uses galvinometric measurements to detect intrusion of a solid body into the danger zone. In this case one or more electrical measurement are continuously made (by pulsing, application of a varying electric current, or direct current, or a combination) between two or more electrically conductive contacts on a control surface(s). A change in conductivity (or related parameter such as impedance if using a varying electric current) indicates the entry of a solid body. In a simple case, an increase in resistance is detected by monitoring a sudden decrease in current between two electrodes. This embodiment of the invention works best with a high frequency (radio frequency) field because such field can be set up more precisely between two points and can be altered specifically by the presence of living tissue that contains electrolytes and that interferes with the electromagnetic (radio) field. Yet another embodiment uses infrared sensor(s) to detect an object, as for example described in U.S. Pat. No. 5,369,269.

For galvinometric (or radiowave field) detection it is best to continuously monitor the space between control surfaces and to detect changes above a baseline conductivity or field strength to signal intrusion of a solid body. This is desired because different waters and conditions can give very different conductivity and/or field penetration characteristics. For example, when the boat moves into water that is more salty, the sensors will detect greater conductivity and/or altered field strength penetration. Such simple filtering for sudden changes allows automatically cancellation of slow changes in background signal and improves system performance. Accordingly it is most preferred to use a comparison step whereby the sensor output continuously is compared with a running average to detect rapid changes above a threshold as for example described in U.S. Pat. No. 4,890,265. In another embodiment a reference signal is used with two or more electrodes or sensor surfaces positioned near each other and by detecting the background change in water conditions (for example conductivity changes) for a comparison. An additional reference sensor similarly can be used for background adjustment for acoustic detection as well.

The Activator Circuit

The activator rapidly stops the motor upon being triggered by the detector and thus halts the propeller. In practice, the sensor and activator "circuits" often are separate portions of a common circuit since they are best combined into a common design. The activator circuit may act upon a fossil fuel powered boat by interrupting ignition sparks to the sparkplug(s), if used and by engaging a friction device. For use with an electric motor, the activator energizes or alters an electromagnetic field(s) to halt the motor movement.

In preferred embodiments for use with internal combustion engine driven propeller systems, the activator interrupts high voltage pulses to the spark plugs and also engages a friction device to absorb kinetic energy of the motor and propeller shaft. A large variety of means for stopping voltage pulses to the spark plug(s) are easily determined by a skilled artisan. The friction device preferably is attached to the motor crankshaft and/or propeller shaft.

A preferred friction device for internal combustion engines is a disk or other solid surface that is attached to the motor and/or propeller shaft and upon which a disk brake pad or shoe applies force, slowing or stopping the rotation. A variety of devices are known that that rapidly stop a spinning axle. For example, Bendix Corporation has designed and sold a variety of friction brake and friction clutch devices, and represents some of the known engineering that may be applied to this embodiment of the invention.

Magnetic braking also may be used to rapidly stop or slow a propeller shaft. In one embodiment a permanent magnet is mounted to the shaft and rotates within a surrounding electromagnet. When braking is desired an electrical current is applied to the electromagnet in a manner (polarity, timing etc) such that the induced electromagnetic field(s) oppose the permanent magnet field(s). This permanent magnet and electromagnet system also may be used as a starter motor for the internal combustion engine and as an electric generator. In another embodiment both the shaft and the surrounding fixed magnetic fields are created by electromagnets, in which case brushes may be used to provide a connection to the moving shaft electromagnet (armature).

In preferred embodiments for stopping an electric motor the activator circuit (or portions of the larger combined circuit) reverses direction of an electromagnetic field of the motor by reversing the polarity of the electric current flowing through the one or more electromagnets until the motor has come to a stop, or a near stop (preferably less than 100 RPM, more preferably less than 60 RPM and most preferably less than 10 RPM) within 0.5 seconds. In another preferred embodiment activator circuit halts the motor within 0.2 seconds and in another preferred embodiment the activator halts the motor within 0.1 seconds. Where the propeller is driven by a separately excited brushed motor the polarity of the fixed coil (outside the armature) is reversed and the back emf or the motor (or motor/propeller rpm) may be monitored until the speed has dropped to zero or below a low detectable value.

Other procedures to rapidly brake electric motors are known and are useful. In the case of a simple permanent magnet motor, the motor kinetic energy may be suddenly absorbed by a circuit that shunts the drive leads to a low resistance. Preferably the polarity of applied voltage is reversed, in a manner that does not overstress the motor. Numerous techniques for rapidly braking an electric motor are known and contemplated for this embodiment of the invention. Examples of such control systems may be found, for example, in U.S. Pat. No. 6,094,023 (Method and Device for Braking an All-mains Motor); U.S. Pat. No. 5,847,533 (Procedure and Apparatus for Braking a Synchronous Motor); U.S. Pat. No. 5,790,355 (Control System); U.S. Pat. No. 4,933,609 (Dynamic Control System for Braking DC Motors); U.S. Pat. No. 3,628,112 (Dynamic Braking of Electric Motors with Load Changing During Braking); U.S. Pat. No. 3,548,276 (Dynamic Braking of Universal Motors); and U.S. Pat. No. 3,794,898 (Dynamic Braking of Electric Motors with Thermistor Braking Circuit), the contents of which specifically are incorporated by reference in their entireties.

An example of rapid braking of high power three phase motors is the product by MTE, a United Kingdom company with a website at entrelec-mte.co.uk. The emergency braking system that is commercially available from this company can be adjusted to halt a motor within 0.5 seconds but could be modified for even shorter stopping times. A boat propeller motor can be halted faster than a corresponding electric car motor because of the lower torque involved with the propeller compared with the car.

Rapid braking of direct current brushless motors is also known to the skilled artisan. The use of a feedback signal based on the back EMF of the motor triggers current flow from the motor into a controller to facilitate an emergency stop, as described for example in U.S. Pat. No. 5,659,231. Also relevant in this context are the disclosures of U.S. Pat. Nos. 6,215,261, 6,084,325 and 6,078,156. Another improvement to resistance based dissipation of motor kinetic energy for brushless motors is described by U.S. No. 4,426,606. This latter patent teaches a way to dissipate energy stored in the inductance of the winding of the brushless motor by selecting a capacitance to match the winding inductance.

Further systems for adding energy into a motor to oppose the forward motion of the motor are well known and an engineer can find such circuits and techniques in the regular literature. In each such preferred embodiment, a rapid braking circuit activates upon sensing an object upstream, near to or within a danger zone or extended danger zone by the sensor circuit. Preferably two or more sensors are used for broader coverage of a danger zone. Even more preferably time averaging is carried out to detect changes in detected signals and eliminate spurious background signals.

Transducer Placement and Use

Figure 6:
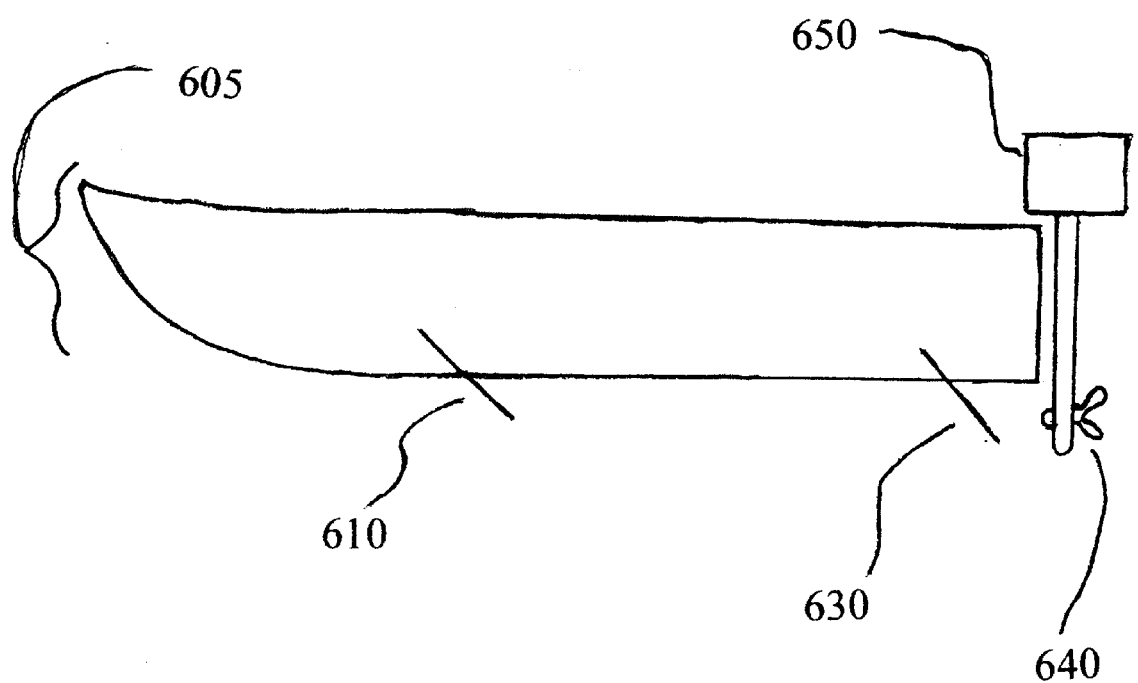
FIG. 6 shows a representative tactile sensor placement in accordance with an embodiment of the invention.

Transducers (both transmitters and receivers, as well as combination devices) may be placed in a wide variety of locations and in a wide variety of combinations. FIGS. 1 to 6 illustrate representative locations and are discussed next. Tactile feeler sensors can be placed in a wide variety of locations. FIG. 6 shows one representative arrangement of four sensors on boat hull 605, two of which are seen in this side view. Sensor 610 is located on the left side and near the deepest part of the 21 foot long hull and extends 3 inches vertically below the lowest point of the hull. Sensor 620 (not shown) is on the other side of the hull. Sensor 630 is near propeller 640 on outboard motor 650, having a tip that is 10 inches away from the propeller. In some embodiments a tactile sensor such as one near the propeller has a flat surface (fin shape) that aligns with the water flow and may resemble a movable fin.

In yet another embodiment the sensor is a piezoelectric device that is attached to a fin or even the hull itself (on the outer surface, or on the inner surface, if stiff enough to transmit vibration such as aluminum or fiberglass). The piezoelectric device monitors solid object collisions, which produce detectable vibrations. In an embodiment sharp short time duration vibration collision(s) with one or more sharp protuberances of a hard object (rock) is distinguished from a longer time duration vibration collision with a muddy or sandy bottom via signal filtering hardware or by software analysis of the information.

FIGS. 1a, 1b, 2a, 3a, and 4c show related embodiments where sensors are positioned above and below the propeller axis. FIG. 4a and FIG. 4b also show optional sensors 402 and 403 that are positioned above the axis and which scan to the port and starboard positions, respectively, of a danger zone. In an embodiment the sensors are angled up from the horizontal to take in most or all of the extended danger zone. The optional two sensor system shown in FIG. 4a and FIG. 4b uses sensors 402 and 403, which are tilted up, but not 401 and can detect solid objects that fall into the water immediately in front of the propeller. In this context sensors 402 and 403 are able to detect object above them, and in some cases as is shown here are angled up for better detection in that area.

FIG. 4b also shows rear-ward facing sensor 431 that monitors part of or all of a danger zone to the rear of propeller 415. In one embodiment sensor 431 is tilted up at an angle to monitor at least part of danger zone 433. Other embodiments of rear-ward facing sensors can be prepared by placing appropriate sensors at other locations of this and other control surfaces and are specifically contemplated.

In some embodiments separate danger zones are sensed both above and below, and to both sides of the propeller axis. Accordingly, it is preferred to use either a single sensor that monitors a wide area, such as sensor 401 in FIGS. 4a and 4b, or, more preferably multiple sensors. In one embodiment of the invention a first sensor is positioned on the left side of a control surface in the middle of a slip stream and monitors at least the left half of the zone. A second sensor positioned on the right side of the control surface monitors at least the right half of the zone.

Figure 3B:
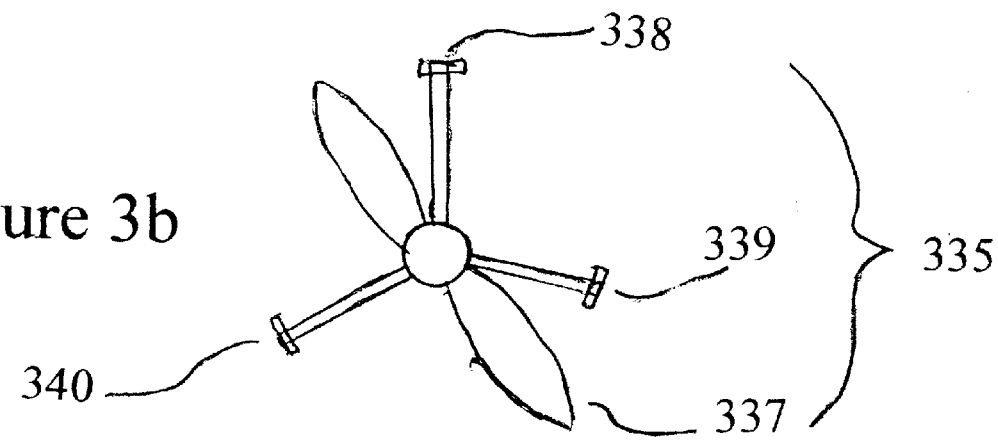
FIG. 3b is a rear view for a three sensor system (on three control surfaces) for detecting imminent propeller contact with a solid body.

In another embodiment 3 sensors are used, with one monitoring the left side or lower left side, one the right side or lower right side, and one monitoring the top of the danger zone. A three sensor system may, for example, utilize control surfaces as shown in FIG. 3b and FIG. 5b. Sensors 401, 402 and 403 of the system shown in FIG. 4c also may be used together in a 3 sensor system. FIG. 3c shows a representative embodiment with four sensors. In some embodiments such sensors may be used to detect the presence of objects to the rear of the propeller. These are particularly important to prevent contact with swimmers who may be behind or at a propeller when the propeller is first turned on, or when the boat motor is switched into reverse.

In some cases to save money and help provide an economical product that would be acceptable (not too costly) to the marketplace, the lower portion of the danger field may be ignored, as such sensing is still better than none.

However, in the non-tactile sensor embodiment, full sensing at least somewhere in the danger zone area within two propeller diameters upstream of the propeller is greatly desired. In a preferred embodiment the monitored danger zone is close to the propeller, and may be within 0 and 1 propeller diameters upstream or downstream of the propeller to more accurately detect all object that will come into contact. In another embodiment the minimum circular area that is constantly monitored is at least 1.5 times the diameter of the propeller and in another embodiment the minimum area being monitored has a diameter that exceeds twice the propeller diameter. These latter cases provide a greater margin of safety. Other geometries can be devised by an engineer and are not presented here for the sake of brevity.

When mounting one or more sensors on the boat hull, preferably one or more piezo transmitters are positioned at the sides of the boat at an angle facing rearwards so as to cover most or substantially all of one or more danger zones. A single sensor may be used at the center line. Preferably, however, sensor(s) located on the hull bottom are used together with one or more at the sides to cover shallow regions of a particular danger zone. In another embodiment the extended danger zone above the propeller is monitored to detect things falling into the water there. In another embodiment tactile sensor(s) are added immediately upstream (within 1, 2, 3, 5, 10 propeller diameter distance from the propeller.)

One or more receivers may be positioned near the transmitters or a single sensing unit (transmitter and receiver) may be combined into a single piezoelectric device as is customarily used for fish finders, for both transmission and detection of sonic energy. In an embodiment, a receiver and transmitter are incorporated into the same device, such as a thin film that may be mounted on a hull. The doppler effect may be used for sensing and a more simple detection of minimum reflected energy measurement can be used. Of course skilled workers have a large range of techniques in this field to implement the sensing. Wires from the piezo devices (if used) preferably pass through the hull behind or near the sensor devices. In a preferred embodiment a high Q high impedance piezo electric sensor is used with a field effect transister amplification stage at or in the sensor. This serves to convert a high impedance low current signal into a lower impedance signal prior to transmittal over electric wires, and makes the system less sensitive to electrical noise.

The system may be turned off while maneuvering next to a dock and the system's sensitivity may be electronically adjusted to sense minimum sized objects to prevent energizing upon detection of small debris or bubbles within the water. This system also may be integrated into a sonar for detection of solid objects such as fish and bottom structures. A skilled electronics artisan will appreciate how to prepare and/or adjust circuitry and/or software to detect particular types of objects. For example, a system that recognizes a rope is useful for avoiding entanglement with lobster traps and the like.

In most cases a sensor is mounted on a control surface, which is a solid surface of the boat or an attached component such as an outboard motor fairing, rudder or fin that contacts the water upstream of the propeller(s) and experiences water flow during forward boat motion. A control surface may influence boat movement. The hull of a boat is a control surface. Preferably a hull surface. close to the propeller is used to mount a sensor, as shown in FIG. 5. A fin, rudder or other surface that participates in boat attitude stability, boat direction, speed and so forth also is a control surface. FIGS.

1 to 5 show representative control surfaces. The control surfaces of FIGS. 1 to 3 are rudder or stabilizer fins, as might be found in a submarine, inboard motor powered boat such as that commercialized by ElectroCruise Boats of Homosassa, Fla., "kakusu maruta" boat such as that commercialized by Maruta Electric Boatworks, and the like. The control surfaces of FIG. 4 are part of an outboard motor such as the type commercialized by Ray Electric Outboards Inc.

Most propellers have one or more control surfaces immediately upsteam of the slip stream to take advantage of the high flow rate of water found immediately in front of the propeller to control boat movement. Likewise, a swimmer's body is at great risk in this area because of the high water flow and the risk of being pulled into that same slip stream. In this context, preferred embodiments of the invention may be thought of as adding intelligence to these control surfaces.

Placing sensors as described herein immediately upstream to the propeller (in the slip stream) on control surfaces provides other advantages relating to boat intelligence as well. Such sensing can report the state of flow of water over those surfaces. That is, the sense signal(s) can be used to output a propulsion status indication, boat speed indication (by virtue of monitoring reflectance from, for examples bubbles that pass between adjacent sensors), cavitation, presence of weeds, water turbidity, relative efficiency of movement useful for controlling optimum motor power, and the like. For example, weeds and turbidity can be detected with correct selection of sonic measurements and/or with infrared detection.

Movable tactile feeler(s) such as a rod, wire or fin may be used that have a sensor to create a continuously variable electrical signal corresponding to pressure on the sensor. Preferably such sensors are further utilized to obtain more information beyond predicting collision with a propeller. A tactile sensor may be arranged that outputs a signal that changes with boat speed. As the boat moves faster, more deflection of the tactile sensor exists and (typically) a greater deviation signal is generated, indicating higher speed. Such sensors thus can be used to detect speed as well as collisions.

Most propellers are used in a reversed direction at times to make a watercraft travel backwards. This motion is especially dangerous to swimmers located to the rear of the propeller and in preferred embodiments one or more sensors are directed to sense a danger zone to the rear of the propeller to alleviate this problem.

Rapid Stopping of an Internal Combustion Engine Driven Propeller

In a preferred embodiment for fossil fuel powered internal combustion engines the activator interrupts high voltage pulses to the spark plugs and also engages a friction device to absorb kinetic energy of the motor and propeller shaft. A large variety of means for stopping voltage to the spark plug is easily determined by a skilled artisan. The friction device preferably is attached to the motor crank shaft and/or propeller shaft.

A preferred friction device is a disc or other solid surface attached to the shaft and upon which a disc brake caliper or shoe applies force, slowing the rotation. A variety of braking devices are known. "Bendix" has commercialized a number of such brakes and clutches over the years that may be used or modified for this embodiment of the invention.

Magnetic braking also may be used to rapidly stop a propeller shaft. In one embodiment a permanent magnet is mounted to the shaft and rotates within a surrounding electromagnet. When a braking is desired, an electric current is applied to the electromagnet in a polarity such that the individual electromagnetic field(s) oppose the permanent magnetic field(s). This electromagnetic/permanent magnet system also may be used as a starter motor for the internal combustion engine and as an electricity generator. In another embodiment both the moving magnetic field(s) and the fixed field(s) are made from electromagnets.

Multiple Users via Multiplex Systems

An important feature of many embodiments of the invention is continuous sensing of one or more danger zones through constant emission of signals, either sonic, galvanometric, infrared, microwaves, or other. When two or more boats come close to each other signal(s) from one boat may be sensed by another. If the interfering signal is similar (eg, in frequency, pulse coding etc) to the expected signal then the interfering signal may trigger an improper propeller turn off. In some situations, such as during collision avoidance maneuvering this turn off can lead to undesirable loss of control. This embodiment of the invention provides systems for removing or alleviating the effects of such cross talk.

According to embodiments of the invention a propeller shut off system automatically senses the presence of the coded sensor of another boat and shifts frequency or pulse form in response. According to this embodiment, after the propeller automatically is shut off in response to sensing an intrusion into a danger zone, the signal generator, (such as piezoelectric transmitter, galvanometric current, infrared radiation, microwave or other electromagnetic radiation etc) is switched off and the danger zone monitored. If the danger zone intrusion signal remains then the system switches into multiplex mode. In multiplex mode the system alters to the use of a different frequency or other signal characteristic, which at least potentially avoids the other signal system. This alteration (turning off the danger probe signal, monitoring for loss of sensed signal, and moving sensor system to a new frequency or pulse characteristic if needed) preferably occurs rapidly, preferably less than 0.5 seconds and more preferably in less than 0.1, 0.1, 0.05 and even less than 0.025 seconds. Because of the short time period required for this operation, in most instances one boat will move its sensor characteristics (such as frequency) before the other danger zone intrusion system is activated.

EXAMPLES OF USE

The sensor circuit(s) are applicable to a wide range of control surfaces.

In these examples the term "sensor" means a piezoelectric device in the context of positioning on a boat hull or other control surface. The term sensor also is used in a general sense to include associated circuitry (not located on the hull in these examples) that output a signal (or trigger a control portion of a common circuit).

Example 1

Piezoelectric of acoustic sensor 20 is mounted on the port side of boat fuselage/fin 10 as shown in FIG. 1*a*. The sensor comprises a flat quartz crystal and a drive/monitoring circuit (located inside the boat) such as used in fish finding equipment and is adjusted to provide a signal when a submerged solid object presenting more than 1 square inch cross sectional area is placed 15 inches directly in front. Another piezoelectric from a second sensor (not shown) is mounted on the opposite starboard side of fuselage/fin 10. The faces (plane of the vibrating piezoelectric crystal) of the sensors are pointed forwards away from the propeller at a 10 degree angle away (toward the starboard and port sides respectively) from the central axis of the boat such that each sensor monitors the water on each respective side of fuselage/fin 10 in front of the propeller.

The signals from sensors 10 and 20 trigger an activator. The activator may brake an internal combustion engine or may control the power to the armature of a permanent magnet electric motor by a control circuit that uses pulse width modulation. The activator in this case includes a voltage sensor (input resistance) that accepts a voltage output from the sensor circuit when a threshold signal indicate a minimum sized object in the danger zone. When sensor 20 and/or the other sensor detect the solid object and cause a signal output, the activator reverses the power output from the controller control circuit until the back electromotive force induced in the control circuit from the kinetic energy of the slowing motor reaches a minimum threshold value (indicating a low or no speed condition).

In a variation of this example, two sensors 30 and 50 are positioned at the top and bottom as in FIG. 1*a*. In yet another embodiment additional sensors 60 and 70 are used in combination with sensors 30 and 50. Here, all four sensors are pointed directly to the front. In another variation rather than using the a single sensor to monitor a given area in a pulse generation and detection mode (such as used for fish finders) one piezoelectric device is used as a transmitter and another used as a receiver, to allow greater short range sensitivity and greater immunity from false signals. In this case pairs of sensors are used (one on top and one on the bottom) to generate a signal at one sensor and receive at the other. If a solid body enters the space near the sensor, that body will reflect sonic energy to the receiver. A threshold detecting circuit then outputs a signal when the reflected energy exceeds a given set value.

Example 2

In this example galvinometric measurements are made using electrodes 110 and electrodes 120 on fin surface 100 shown in FIG. 1*b*. The measurements are input into a comparator that monitors and adjusts for long term (more than 5 seconds) changes in conductivity. When a solid object enters the volume between the upper and lower electrodes, galvinometric measurements indicate a short term change in conductivity and output a signal to a control circuit, stopping the propeller. In further embodiments conductivity between pairs of facing electrodes is used to detect an approaching body, which perturbs conductivity between the left most electrodes before doing so to pairs of electrodes to the right.

Example 3

In this example, boat hull 150 of FIG. 1 has an attached propeller 160 and a outside-rear facing piezoelectric sensor 170. A second sensor that also faces outside (away from the boat) and towards the rear is mounted on the opposite side from sensor 170. Both sensors (including their signal analysis circuitry) monitor for intrusion of a solid body and are adjusted to ignore signals from the propeller. Upon detection of a solid body, the motor/propeller control circuit causes the propeller to stop suddenly.

In a variation shown in FIG. 1*d* boat hull 180 has an attached propeller 185 and three outside-rear facing piezoelectric sensors. Sensor 188 is located at the bottom of the hull and sensor 187 is located two thirds the way up the hull on the port side. A third sensor (not shown) is located two thirds the way up the hull on the port side. The three sensor have overlapping fields of detection. In this example each piezoelectric sensor uses a separate frequency and can locate a solid body independently.

In another embodiment related to this four sensors facing out and to the rear are used on a hull such as shown as hull 180. One transmitting sensor is at the bottom at the location of sensor 188. A second transmitting sensor is at the center top of the hull. Half way between the two transmitting sensors and half way up on both sides are two receiving sensors. During operation the transmitting sensors emit 20 Khz sonic vibrations. The side-mounted sensors receive some sonic energy reflected off of the propeller blades and this reflected signal is filtered out by a filtering circuit. When a solid object enters a danger zone, (which is defined for purposes of illustration as half way from the sensors to the propeller) the reflected signal from either the top and bottom transmitter is received by at least one of the side receivers and an output signal is sent to a control circuit that rapidly stops the propeller.

In another embodiment 6 sensors are equally spaced in a ring in like manner about the axis of a hull as shown in FIG. 1*d* with alternating transmitting and receiving piezoelectric transmitters and receivers. The extra sensors improves the coverage available. In yet another embodiment the sensors as described in this example are mounted 6 inches to the front of the propeller at separate locations (top and bottom, side etc) as before, but facing out and forward, away from the propeller.

Figure 2A:
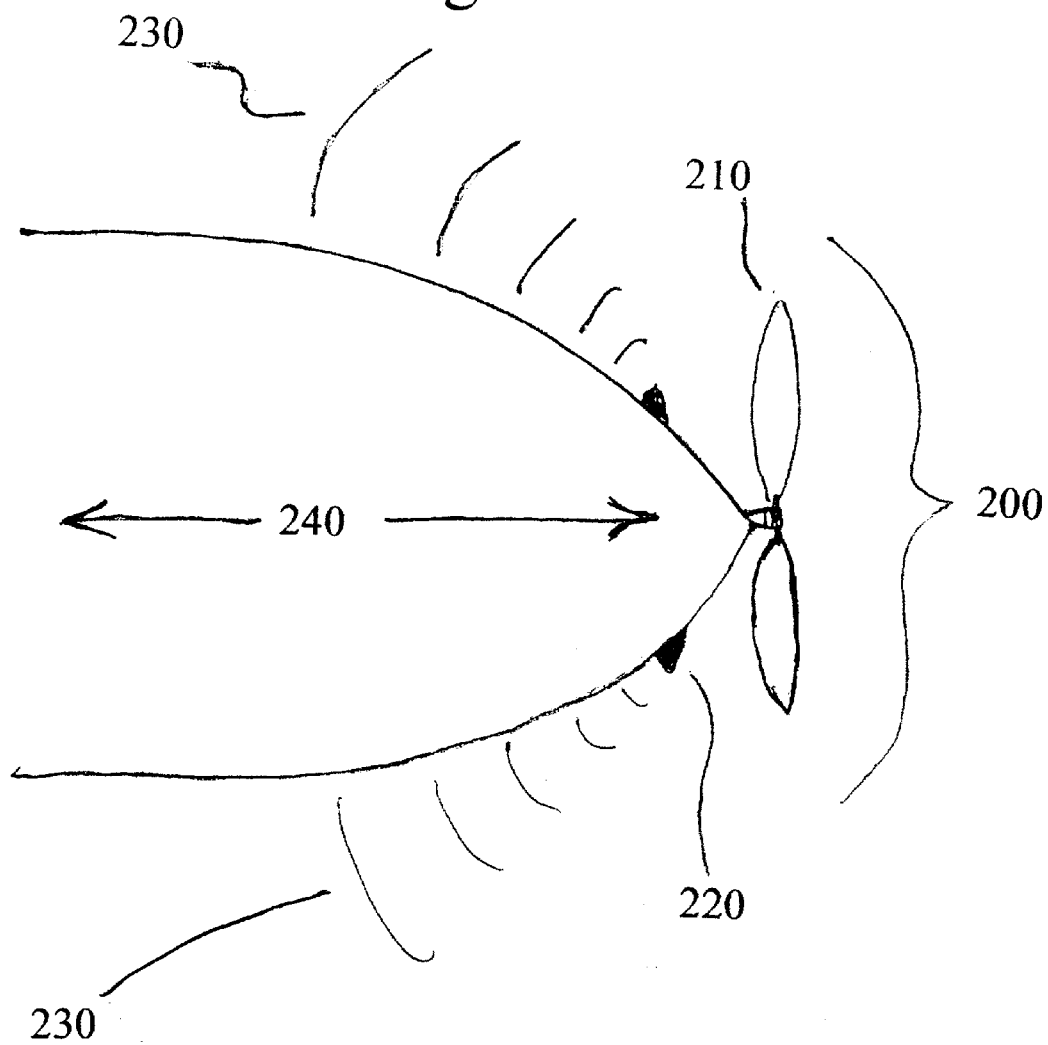
FIG. 2a shows a sonic sensor system that directs emission and/or detection of sonic vibration away from the propeller to limit spurious signals produced by cavitation.
Figure 2B:
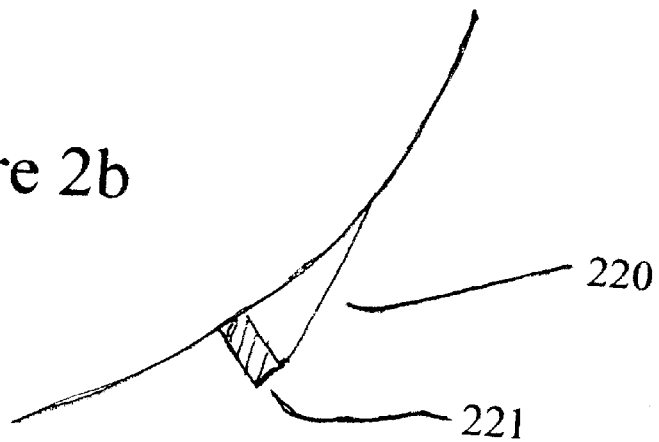

Preferably the sensors are pointing between 5 degrees and 60 degrees away from the long axis of the boat, and more preferably between 15 degrees and 45 degrees. FIG. 2 depicts this embodiment of the invention. Boat hull 200 has attached propeller 210. Sensors 220 and 225 are shown at the bottom and top of the hull respectively for convenience. Sonic waves 230 are emitted from the sensors, which also detect reflective signals. Sensor 220 has face 221 that points away from propeller 210 (FIG. 2*b*). The plane of 221 is partly perpendicular to boat axis 240. The angle between vector 240 and face 221 (FIG. 2*a*) preferably is between 15 and 45 degrees. In other embodiments sensors have similar respective faces that may point toward the propeller at the rear, and preferably make an angle between 15 and 45 degrees with respect to the boat axis vector.

When using rear directed sensors, it is important to space the sensors further away from the propeller, preferably between 1 and 5 propeller diameters from the propeller towards the front of the boat. It is important in these cases generally to correct for signals produced from the propeller, as the propeller will generate a reflected signal. In one embodiment a propeller speed signal (preferably measured from a tachometer) is input to a correction circuit that will help correct for the propeller signal. The background propeller signal in most instances will change with propeller speed. By monitoring the speed, better background signal correction can be used.

Example 4

This example illustrates detection of a solid object using sensors attached to one or more fins immediately in front of the propeller.

Figure 3A:
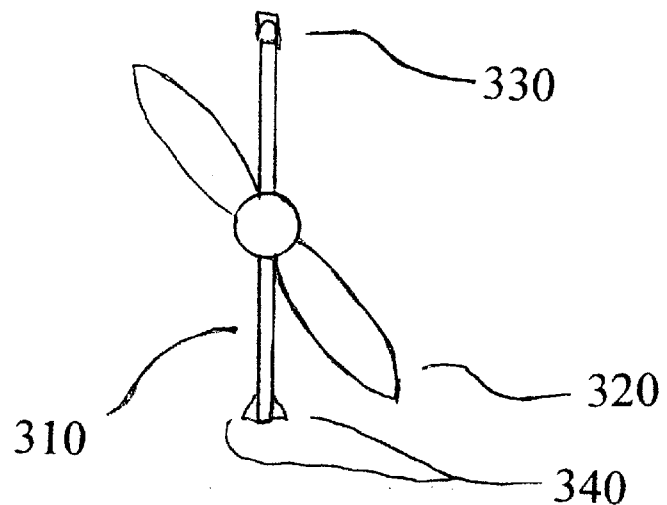
FIG. 3a is a rear view of a two sensor system (on two control surfaces) for detecting imminent propeller contact with a solid body.
Figure 3C:
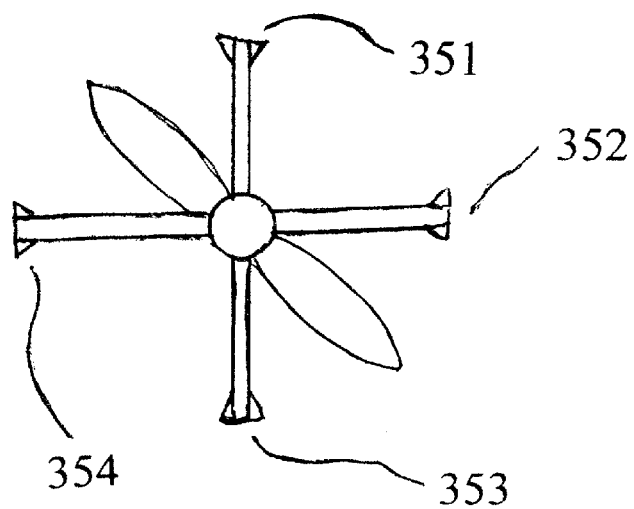
FIG. 3c is a rear view for a four sensor system for detecting imminent propeller contact with a solid body.

FIG. 3*a* shows single axis fin 310 in front of propeller 320. Sensors 330 and 340 are mounted to the tops and bottom of fin 310 4 inches in front of propeller 329 and face forward. These sensors are piezoelectric and detect solid objects in the manner described in Example 3. FIG. 3*b* shows 3 axis fin 335 in front of propeller 337 with sensors 338, 339 and 340 at the tips of the fins facing directly forward and perpendicular to the boat long axis. In this example, the fins have the greatest size at the very rear near the propeller (not shown). Thus, the sensors have clear space in front to send and receive sonic vibrations to detect intruding solid objects. The individual sensors can be independent (the same piezoelectric device is both a transmitter and receiver) or may be coordinated with each other by sending signal(s) between them. Upon sensing intrusion of a solid body via reflected sonic energy (echo) from the intruding body surface, a sensor or sensor combination triggers a control circuit to quickly stop the propeller.

FIG. 3c shows placement of four sensors 351, 352, 353 and 354 at the upstream sides of four fin tips. These sensors work in like manner to that explained for the sensors of FIG. 3b.

Example 5

In this example sensor 401 is mounted at the leading edge of vertical post 405 of electric outboard motor 410 shown in FIG. 4a. During operation the sensor scans the water ahead of the propeller and (via its circuitry) is adjusted to create a propeller immediate stop signal when detecting a new solid object having 2 square inches of cross sectional area perpendicular to the sonic emissions of the sensor within 2 feet of that sensor. The sensor can be adjusted to additionally detect solid object intrusion into the extended danger zone represented as plane 421 in FIG. 4b. Plane 421 extends in a vertical axis from the water surface on the right side of 421 down to the top of the propeller and is as wide as two propeller widths. (Sensors 402 and 403, also shown in this figure are optional and are not used in this example.)

Example 6

Figure 4C:
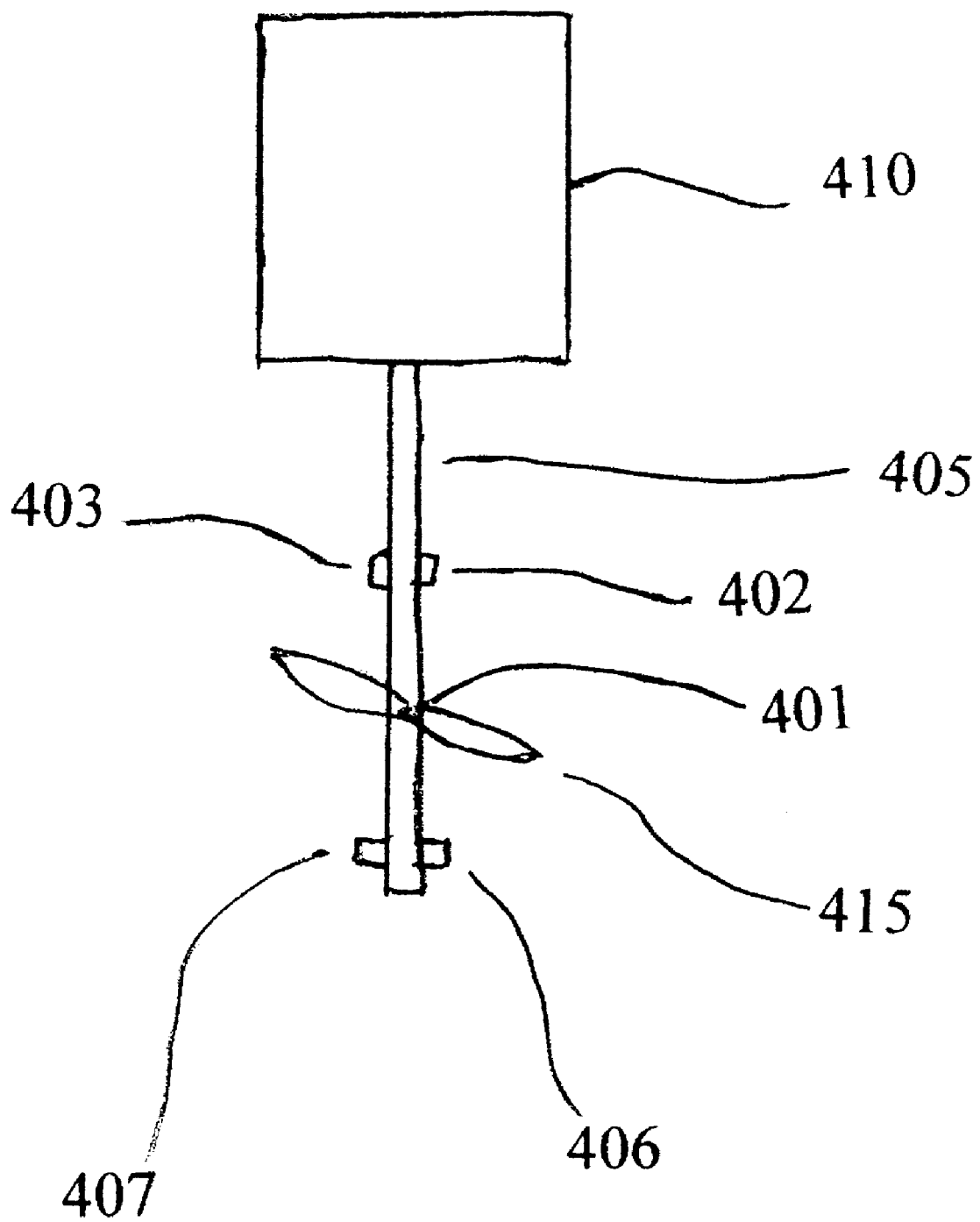

In this example sensors 406, 407, 402, and 403 are attached to vertical post 405 of electric outboard motor 410 shown in FIG. 4c. The sensors are mounted on the bow side of post 405 in front of propeller 415. Sensors 402 and 406 are pointed slightly to the left (preferably 5 to 45 degrees to the left of the boat long axis). Sensors 403 and 407 are pointed slightly to the right (preferably 5 to 45 degrees to the right of the boat long axis). During operation the sensors scan the water ahead of the propeller and are adjusted to create a propeller immediate stop signal when detecting a new solid object within 2 feet of a sensor.

Example 7

In this example 2 rear-ward facing sonic sensors 556 and 555 are mounted equally spaced from the center line of a 21 foot long boat hull and half way up the water line, and face propeller 560 (FIG. 5a). The sensors detect a body that enters the water near the propeller and activate an immediate propeller brake sequence upon detecting a solid object that enters the danger zone 2 feet in front of the propeller. In another example the sensors are further away (4 feet in front of) the propeller.

Example 8

In this example sensors 510, 520 and 530 are mounted on hull 500 3.5 feet in front of propeller 540 as depicted in FIG. 5b. The propeller in this case has a diameter of 14 inches. Each sensor is facing directly to the rear and is perpendicular to the boat long axis. Each sensor is mounted 24 inches away from the axis of the propeller. During use, the sensor signals are corrected for the propeller signal and, after correction is made, a solid object is detected by reflection of sonic vibration as described above.

One embodiment of the invention is a correction system for diminishing the propeller signal from the detection signal. This correction system may be implemented in hardware or in software. The system uses at least two and preferably at least 3 separate sensors (as shown in FIG. 5b) that face to the rear and that are equally affected by the propeller. By placing each sensor the same distance away from the propeller and matching each sensor's characteristics, the sensor outputs are compared to detect a new object entering the danger zone. That is, each sensor will output the same propeller signal. That strong background signal is automatically negated by comparing each signal with each other. One way to implement this embodiment of the invention is to subtract one signal from the other to obtain a difference signal. If the difference is greater than a threshold value then a propeller stop signal is generated.

In practice, this automatic correction system works best when the propeller rotates rapidly. A time constant for each sensor output should take into account the propeller speed and time between each propeller blade comes in front of each sensor. By comparing each sensor output, with compensation for the delay between presentation of propeller blades in front of each detector this system can sensitively detect intrusion of a solid object. In a most preferred embodiment, a three blade propeller is used with a three sensor system where the sensors are equally spaced around the propeller, providing the most even propeller background signal for correction. This embodiment as well as the others may be implemented with a microprocessor executing a stored program.

Other combinations of the inventive features described above, of course easily can be determined by a skilled artisan after having read this specification, and are included in the spirit and scope of the claimed invention. References cited above are specifically incorporated in their entireties by reference and represent art known to the skilled artisan

I claim:

1. A system to limit contact of a propeller having a diameter D with a solid object in a motor driven watercraft comprising:
    (a) at least one sensor that monitors in front of a danger zone, the zone comprising a circular area of diameter D located distance D immediately ahead of the propeller perpendicular to the direction of motion and outputs a signal in response to intrusion of a solid object in the monitored area; and
    (b) an activator electric control circuit that stops motor movement upon receipt of the signal from (a); and a signal analysis circuit that (i) receives a signal from each of the at least one monitor sensors, (ii) compares the signals and (iii) outputs a signal to indicate detection of an object; wherein the signal analysis circuit detects a phase shift in the at least one sensor of (a).

2. A system as described in claim 1, further comprising a friction device to rapidly stop a propeller of the watercraft.

3. A system as described in claim 1, further comprising a magnetic brake.

4. A system as described in claim 1, wherein the sensor comprises at least one inorganic piezo transmitter and at least one polymer piezoelectric device.

5. A system as described in claim 1, wherein the sensor comprises at least two piezoelectric devices located at two or more locations of a hull or hull extension with at least one transmitter sending energy away from the hull in one direction and at least one receiver facing away at a different direction to receive energy.

6. A system as described in claim 1, wherein the sensor comprises one or more piezoelectric devices that utilize sonic energy above 100,000 hertz.

7. A system as described in claim 1, wherein the sensor comprises at least one wide band piezoelectric sensor that detects at least two signals simultaneously.

8. A system as described in claim 1, wherein a sensor receiver constantly reads a reflection signal and step (b)(ii) compares a difference in the received signal over a previous background signal to detect the object.

9. A system as described in claim 1, that continuously monitors the space between control surfaces and detects changes from a baseline conductivity, impedance or field strength to detect a solid body.

10. A watercraft comprising the system of claim 1.

11. A watercraft comprising the system of claim 10, wherein at least one sensor is on the inner surface of the watercraft.

12. A kit comprising the system of claim 1, further comprising a fastener for attaching a sensor to the watercraft surface.

13. The system of claim 1, wherein the phase shift is compared to a stored or calculated value or range to discriminate near versus far range objects.

14. The system of claim 1, wherein the signal analysis circuit comprises a lock in circuit.

15. A system to limit contact of a propeller having a diameter D with a solid object in a motor driven watercraft comprising:
   (a) at least one sensor that monitors in front of a danger zone, the zone comprising a circular area of diameter D located distance D immediately ahead of the propeller perpendicular to the direction of motion and outputs a signal in response to detection of intrusion of a solid object in the monitored area; and
   (b) an activator electric control circuit that stops motor movement upon receipt of the signal from (a), wherein at least one first sensor comprises a piezoelectric device that continuously emits a sonic vibration and at least one second sensor comprises a piezoelectric device that continuously detects or waits for a reflection of the sonic vibration from the first sensor.

16. A system as described in claim 15, further comprising a friction device to rapidly stop a propeller of the watercraft.

17. A system as described in claim 15, further comprising a magnetic brake.

18. A system as described in claim 15, wherein the sensor comprises at least one inorganic piezo transmitter and at least one polymer piezoelectric device.

19. A system as described in claim 15, wherein the sensor comprises at least two piezoelectric devices located at two or more locations of a hull or hull extension with at least one transmitter sending energy away from the hull in one direction and at least one receiver facing away at a different direction to receive energy.

20. A system as described in claim 15, wherein the sensor comprises one or more piezoelectric devices that utilize sonic energy above 100,000 hertz.

21. A system as described in claim 15, wherein the sensor comprises at least one wide band piezoelectric sensor that detects at least two signals simultaneously.

22. A system as described in claim 15, wherein a sensor receiver constantly reads a reflection signal and step (b)(ii) compares a difference in the received signal over a previous background signal to detect the object.

23. A system as described in claim 15, wherein at least one piezo electric sensor is attached to a control surface.

24. A system as described in claim 15, wherein at least one piezo electric sensor is attached to an outboard motor.

25. A system as described in claim 15, wherein the motor is an outboard motor and the danger zone is at least in front of the propeller or to the rear of the propeller.

26. A watercraft comprising the system of claim 15.

27. A watercraft as described in claim 26, wherein the watercraft is powered by an internal combustion motor and the system comprises at least one friction or magnetic brake.

28. A watercraft comprising the system of claim 15, wherein at least one sensor is on the inner surface of the watercraft.

29. A kit comprising the system of claim 15, comprising a fastener for attaching a sensor to the watercraft surface.

30. A system to limit contact of a propeller having a diameter D with a solid object in a motor driven watercraft comprising:
   (a) at least one sensor that monitors in front of a danger zone, the zone comprising a circular area of diameter D located distance D immediately ahead of the propeller perpendicular to the direction of motion and outputs a signal in response to intrusion of a solid object in the monitored area; and
   (b) an activator electric control circuit that stops motor movement upon receipt of the signal from (a), wherein the activator control circuit changes the polarity of a motor drive circuit.

31. A system as described in claim 30, further comprising a friction device to rapidly stop a propeller of the watercraft.

32. A system as described in claim 30, further comprising a magnetic brake.

33. A system as described in claim 30, wherein the sensor comprises at least one inorganic piezo transmitter and at least one polymer piezoelectric device.

34. A system as described in claim 30, wherein the sensor comprises at least two piezoelectric devices located at two or more locations of a hull or hull extension with at least one transmitter sending energy away from the hull in one direction and at least one receiver facing away at a different direction to receive energy.

35. A system as described in claim 30, wherein the sensor comprises one or more piezoelectric devices that utilize sonic energy above 100,000 hertz.

36. A system as described in claim 30, wherein the sensor comprises at least one wide band piezoelectric sensor that detects at least two signals simultaneously.

37. A system as described in claim 30, wherein a sensor receiver constantly reads a reflection signal and step (b)(ii) compares a difference in the received signal versus a previous background signal to detect the object.

38. A system as described in claim 30, that continuously monitors the space between control surfaces and detects changes from a baseline conductivity, impedance or field strength to signal intrusion of a solid body.

39. A watercraft comprising the system of claim 30.

40. A watercraft comprising the system of claim 30, wherein at least one sensor is on the inner surface of the watercraft.

41. A kit comprising the system of claim 30, further comprising a fastener for attaching a sensor to the watercraft surface.

42. The system of claim 30, wherein a signal detected using the sensor is compared to a stored or calculated value or range to discriminate near versus far range objects.

43. The system of claim 30, further comprising a lock in circuit.

44. An electrical control device for suddenly stopping a propeller in a motor driven watercraft, comprising a sensor that detects a solid object near the propeller and a control circuit that can stop or slow the propeller to less than 10 rpm within one second, wherein the sensor triggers the control circuit upon sensing the solid object, the motor is an electric motor and the control circuit reverses the voltage to a circuit of the electric motor.

45. A system as described in claim 44, wherein the sensor comprises at least one inorganic piezo transmitter and at least one polymer piezoelectric device.

46. A system as described in claim 44, wherein the sensor comprises at least two piezoelectric devices located at two or more locations of a hull or hull extension with at least one transmitter sending energy away from the hull in one direction and at least one receiver facing away at a different direction to receive energy.

47. A system as described in claim 44, wherein the sensor comprises one or more piezoelectric devices that utilize sonic energy above 100,000 hertz.

48. A system as described in claim 44, wherein the sensor comprises at least one wide band piezoelectric sensor that detects at least two signals simultaneously.

49. A system as described in claim 44, wherein a sensor receiver constantly reads a reflection signal and a difference in the received signal versus a previous background signal indicates entry of an object into the monitored area.

50. A system as described in claim 44, that continuously monitors the space between control surfaces and detects changes from a baseline conductivity, impedance or field strength to signal intrusion of a solid body.

51. A watercraft comprising the system of claim 44.

52. A watercraft comprising the system of claim 44, wherein at least one sensor is on the inner surface of the watercraft.

53. A kit comprising the system of claim 44, further comprising a fastener for attaching a sensor to the watercraft surface.

54. The system of claim 44, wherein a sensor signal is compared to a stored or calculated value or range to discriminate near versus far range objects.

55. The system of claim 44, comprising a lock in circuit.

56. An electric outboard comprising the system of claim 44.

\* \* \* \* \*